United States Patent
Kim et al.

(10) Patent No.: US 10,750,546 B2
(45) Date of Patent: Aug. 18, 2020

(54) METHOD FOR TRANSMITTING SOUNDING REFERENCE SIGNAL IN WIRELESS COMMUNICATION SYSTEM SUPPORTING UNLICENSED BAND, AND APPARATUS SUPPORTING SAME

(71) Applicant: LG ELECTRONICS INC., Seoul (KR)

(72) Inventors: Seonwook Kim, Seoul (KR); Joonkui Ahn, Seoul (KR); Kijun Kim, Seoul (KR); Yunjung Yi, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/678,794

(22) Filed: Nov. 8, 2019

(65) Prior Publication Data

US 2020/0077452 A1   Mar. 5, 2020

Related U.S. Application Data

(63) Continuation of application No. 16/252,492, filed on Jan. 18, 2019, which is a continuation of application
(Continued)

(51) Int. Cl.
*H04W 74/08* (2009.01)
*H04L 27/00* (2006.01)
(Continued)

(52) U.S. Cl.
CPC .......... *H04W 74/0858* (2013.01); *H04L 5/00* (2013.01); *H04L 5/001* (2013.01); *H04L 5/005* (2013.01);
(Continued)

(58) Field of Classification Search
CPC ......... H04W 74/0858; H04W 74/0875; H04W 72/10; H04W 72/0446; H04L 5/005; H04L 25/0224
See application file for complete search history.

(56) References Cited

U.S. PATENT DOCUMENTS

2016/0345206 A1* 11/2016 Yerramalli .......... H04W 72/042
2017/0251497 A1*  8/2017 Larsson ............ H04W 74/0816
(Continued)

FOREIGN PATENT DOCUMENTS

WO        2016048227        3/2016

OTHER PUBLICATIONS

PCT International Application No. PCT/KR2017/004790, Written Opinion of the International Searching Authority dated Jul. 24, 2017, 15 pages.
(Continued)

*Primary Examiner* — Rina C Pancholi
(74) *Attorney, Agent, or Firm* — Lee Hong Degerman Kang Waimey

(57) ABSTRACT

Disclosed are a method for transmitting, by a terminal, a sounding reference signal to a base station without a physical uplink shard channel in a licensed assisted access (LAA) system in which a base station or a terminal performs listen-before-talk (LBT)-based signal transmission, and an apparatus supporting the same.

10 Claims, 12 Drawing Sheets

Related U.S. Application Data

No. 16/096,661, filed as application No. PCT/KR2017/004790 on May 10, 2017.

(60) Provisional application No. 62/334,381, filed on May 10, 2016, provisional application No. 62/370,719, filed on Aug. 4, 2016, provisional application No. 62/373,345, filed on Aug. 10, 2016.

(51) Int. Cl.

| | | |
|---|---|---|
| *H04W 72/12* | (2009.01) | |
| *H04L 5/00* | (2006.01) | |
| *H04L 25/02* | (2006.01) | |
| *H04W 72/04* | (2009.01) | |
| *H04W 72/10* | (2009.01) | |

(52) U.S. Cl.
CPC ........ *H04L 5/0048* (2013.01); *H04L 25/0224* (2013.01); *H04L 27/0006* (2013.01); *H04W 72/0446* (2013.01); *H04W 72/10* (2013.01); *H04W 72/12* (2013.01); *H04W 74/08* (2013.01); *H04W 74/0875* (2013.01)

(56) References Cited

U.S. PATENT DOCUMENTS

| | | | |
|---|---|---|---|
| 2017/0257852 A1* | 9/2017 | Wu | H04B 7/063 |
| 2018/0323917 A1* | 11/2018 | Um | H04L 5/0053 |
| 2019/0159266 A1 | 5/2019 | Kim et al. | |

OTHER PUBLICATIONS

Samsung, "Discussion on SRS for UL LAA", 3GPP TSG RAN WG1 Meeting #84bis, R1-162665, Apr. 2016, 4 pages.

Catt, "SRS design for Rel-14 eLAA", 3GPP TSG RAN WG1 Meeting #84bis, R1-162261, Apr. 2016, 3 pages.

Etri, "Aperiodic SRS transmission without PUSCH for eLAA", 3GPP TSG RAN WG1 Meeting #84bis, R1-163124, Apr. 2016, 4 pages.

Huawei, et al., "Summary on [85-15] SRS without PUSCH in eLAA", 3GPP TSG RAN WG1 Meeting #84bis, R1-162729, Apr. 2016, 3 pages.

European Patent Office Application Serial No. 17796355.0, Search Report dated Oct. 22, 2019, 9 pages.

Nokia Networks, et al., "Channel Access for the Support of LAA UL", R1-160914, 3GPP TSG RAN WG1 Meeting #84, Feb. 2016, 7 pages.

LG Electronics, "LBT schemes of LAA UL", R1-162473, 3GPP TSG RAN WG1 meeting #84bis, Apr. 2016, 11 pages.

U.S. Appl. No. 16/252,492, Office Action dated Mar. 14, 2019, 24 pages.

U.S. Appl. No. 16/252,492, Office Action dated Mar. 14, 2019, 20 pages.

Zte, et al., "Discussion on the UL LBT for LAA", 3GPP TSG RAN WG1 Meeting #84bis, R1-162328, Apr. 2016, 7 pages.

Mediatek, "On priority classes for uplink LBT", 3GPP TSG RAN WG1 Meeting #84bis, R1-162942, Apr. 2016, 4 pages.

Huawei, et al., "Discussion on the application of LBT options in eLAA", 3GPP TSG RAn WG1 Meeting #84bis, R1-162602, Apr. 2016, 3 pages.

Huawei, et al., "Other issues related to LBT for eLAA", 3GPP TSG RAN WG1 Meeting #84bis, R1-162603, Apr. 2016, 4 pages.

Sharp, "Methods of UL LAA channel access", 3GPP TSG RAN WG1 Meeting #84bis, R1-162839, Apr. 2016, 4 pages.

\* cited by examiner

FIG. 9
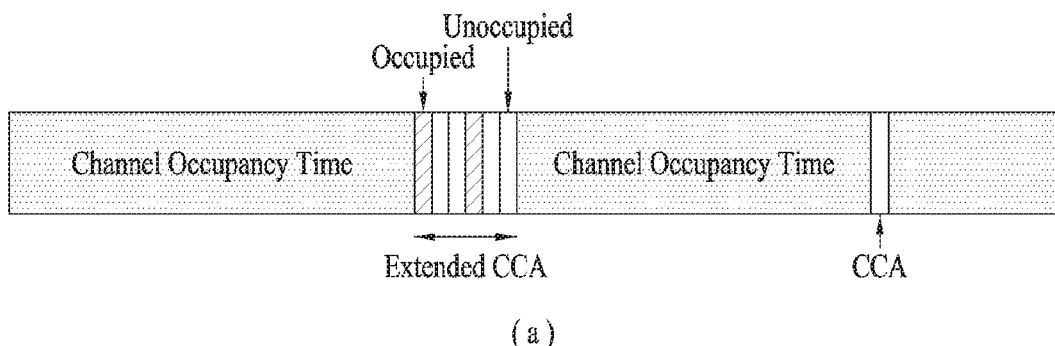
(a)
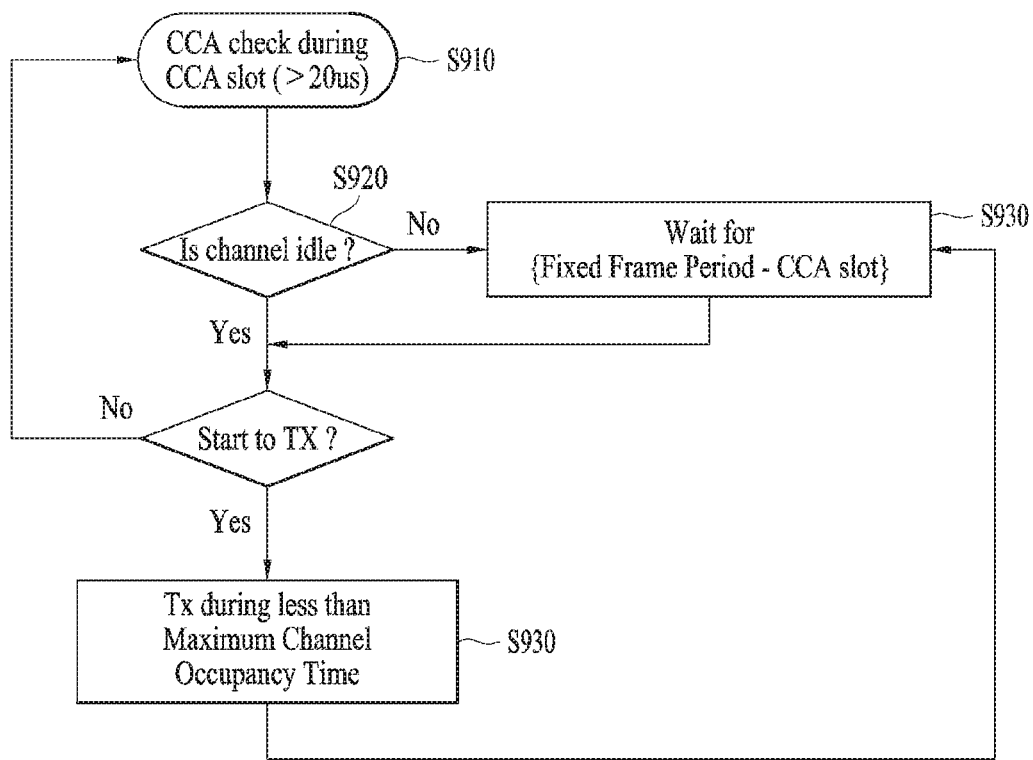
(b)

METHOD FOR TRANSMITTING SOUNDING REFERENCE SIGNAL IN WIRELESS COMMUNICATION SYSTEM SUPPORTING UNLICENSED BAND, AND APPARATUS SUPPORTING SAME

CROSS-REFERENCE TO RELATED APPLICATIONS

This application is a continuation of U.S. patent application Ser. No. 16/252,492, filed on Jan. 18, 2019, now U.S. Pat. No. 10,660,138, which is a continuation of U.S. patent application Ser. No. 16/096,661, filed on Oct. 25, 2018, currently pending, which is the National Stage filing under 35 U.S.C. 371 of International Application No. PCT/KR2017/004790, filed on May 10, 2017, which claims the benefit of U.S. Provisional Application No. 62/334,381, filed on May 10, 2016, 62/370,719, filed on Aug. 4, 2016 and 62/373,345, filed on Aug. 10, 2016, the contents of which are all hereby incorporated by reference herein in their entirety.

TECHNICAL FIELD

Following description relates to a wireless communication system supporting an unlicensed band, and more particularly, to a method of transmitting a sounding reference signal without transmitting a physical uplink shared channel in a wireless communication system supporting an unlicensed band and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Task

When a terminal transmits a sounding reference signal (SRS) not including transmission of a physical uplink shared channel (PUSCH), an object of the present invention is to newly define LBT (Listen-Before-Talk) performed by the terminal based on a characteristic of an unlicensed band and provide a method for a terminal to transmit an SRS based on the newly defined LBT.

In particular, an object of the present invention is to provide a method for a terminal to more reliably transmit an SRS by newly defining an LBT operation for transmitting the SRS only without PUSCH.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method for a user equipment to transmit a sounding reference signal to a base station in a wireless communication system supporting an unlicensed band and apparatuses supporting the same.

To achieve these and other advantages and in accordance with the purpose of the present invention, as embodied and broadly described, according to one embodiment, a method of transmitting an sounding reference signal (SRS), which is transmitted by a user equipment to a base station in a wireless communication system supporting an unlicensed band, includes performing LBT (Listen-Before-Talk) for transmitting an SRS and, if the LBT succeeds, transmitting the SRS. In this case, if the SRS transmission does not include physical uplink shared channel (PUSCH) transmission, the LBT may correspond to random backoff-based LBT based on a predetermined channel access priority class.

To further achieve these and other advantages and in accordance with the purpose of the present invention, according to a different embodiment, a user equipment transmitting an sounding reference signal to a base station in a wireless communication system supporting an unlicensed band includes a transmitting unit and a processor configured to operate in a manner of being connected with the transmitting unit, the processor configured to perform LBT (Listen-Before-Talk) for transmitting an SRS, the processor, if the LBT succeeds, configured to transmit the SRS. In this case, if the SRS transmission does not include physical uplink shared channel (PUSCH) transmission, the LBT may correspond to random backoff-based LBT based on a predetermined channel access priority class.

In this case, the SRS can be transmitted in the last symbol in time dimension among symbols included in a subframe.

The LBT may correspond to random backoff-based LBT based on a channel access priority class having a smallest contention window size among a plurality of channel access priority classes.

For example, the LBT may correspond to random backoff-based LBT based on a channel access priority class having a value of {3,7} as an allowed contention window size.

A value selected from among 3 and 7 can be applied as a contention window size applied to the LBT for transmitting the SRS according to whether a contention window size recently applied to LBT for transmitting PUSCH corresponds to a minimum contention window size or an increased contention window size.

Specifically, when the contention window size recently applied to the LBT for transmitting the PUSCH corresponds to the minimum contention window size, 3 is applied as the contention window size applied to the LBT for transmitting the SRS and when the contention window size recently applied to the LBT for transmitting the PUSCH corresponds to the increased window size, 7 can be applied as the contention window size applied to the LBT for transmitting the SRS.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

As is apparent from the above description, the embodiments of the present disclosure have the following effects.

According to the present invention, when an SRS is transmitted only without a PUSCH in a wireless access system supporting an unlicensed band, a terminal can more reliably transmit an SRS via an unlicensed band.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 9 is a diagram illustrating an exemplary Load Based Equipment (LBE) operation as one of the LBT operations;

BEST MODE

Mode for Invention

Figure 1:
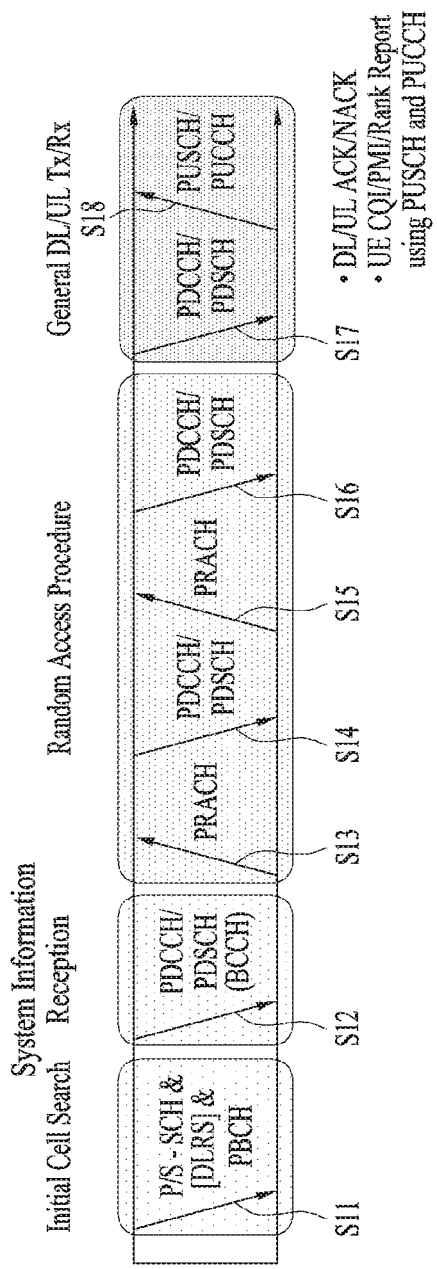
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), and CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
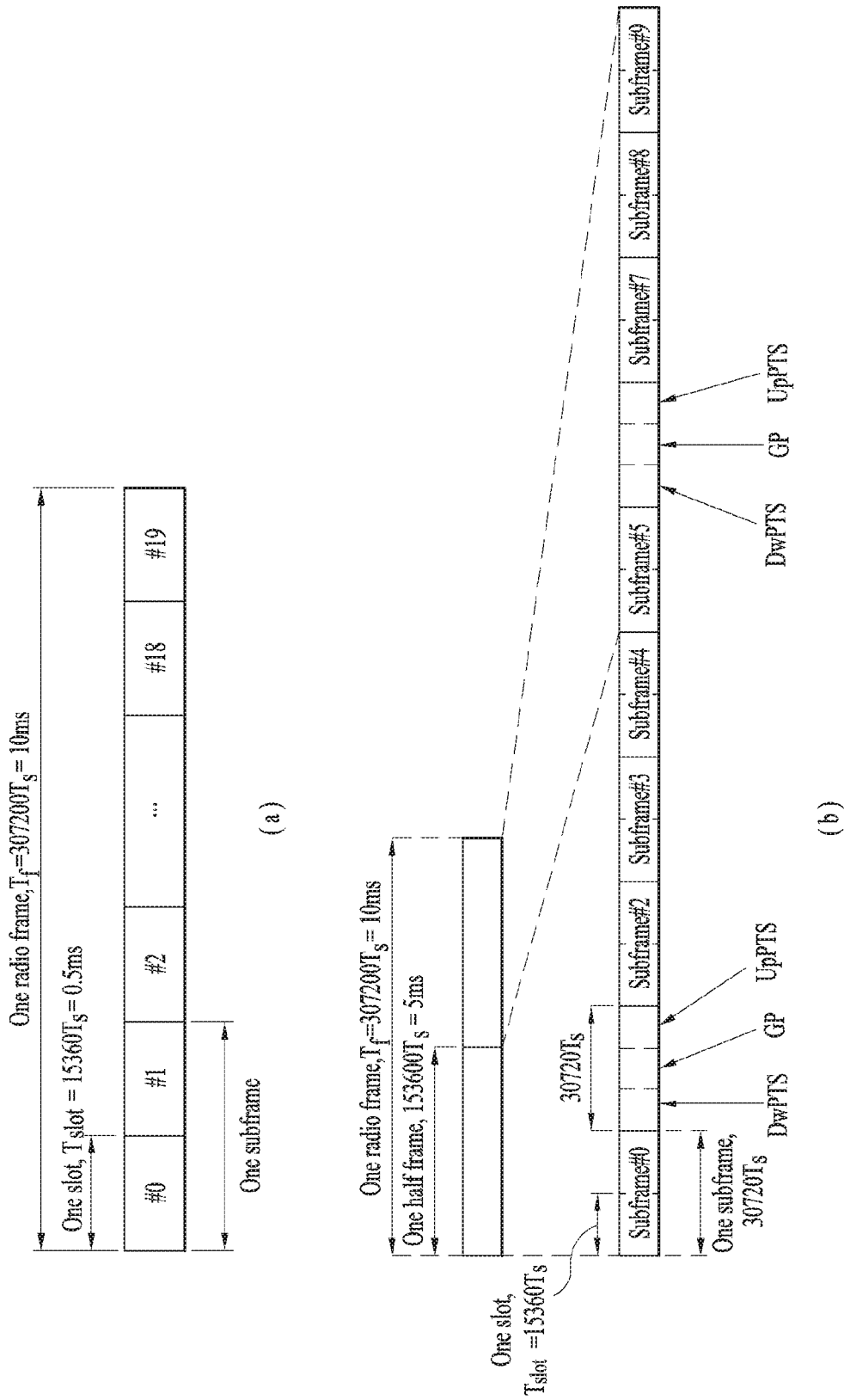
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
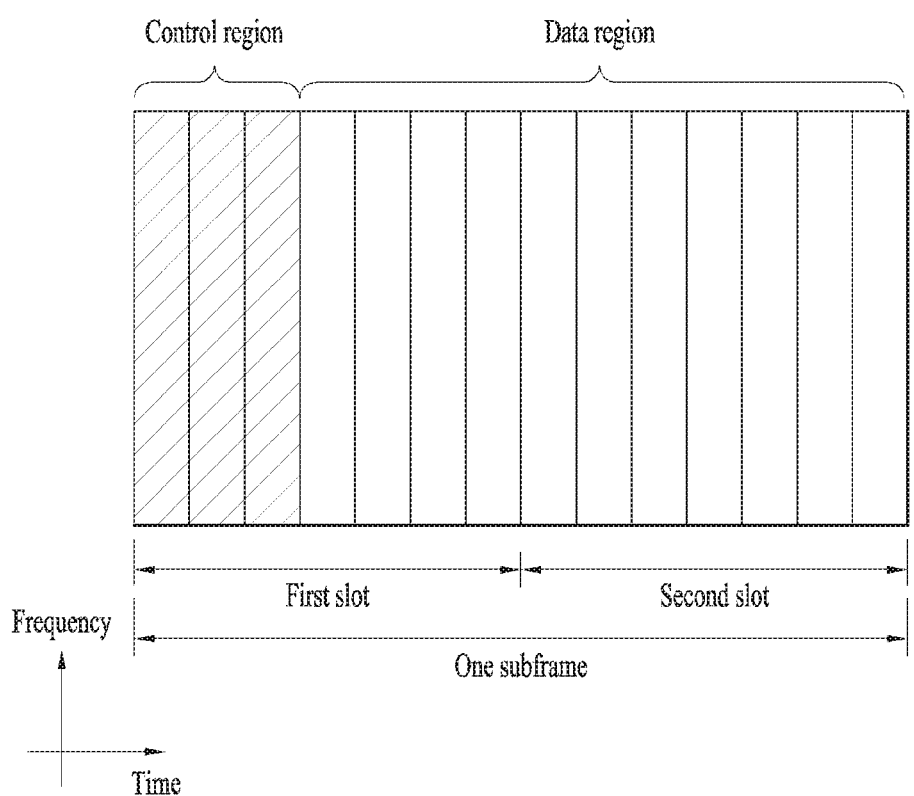
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
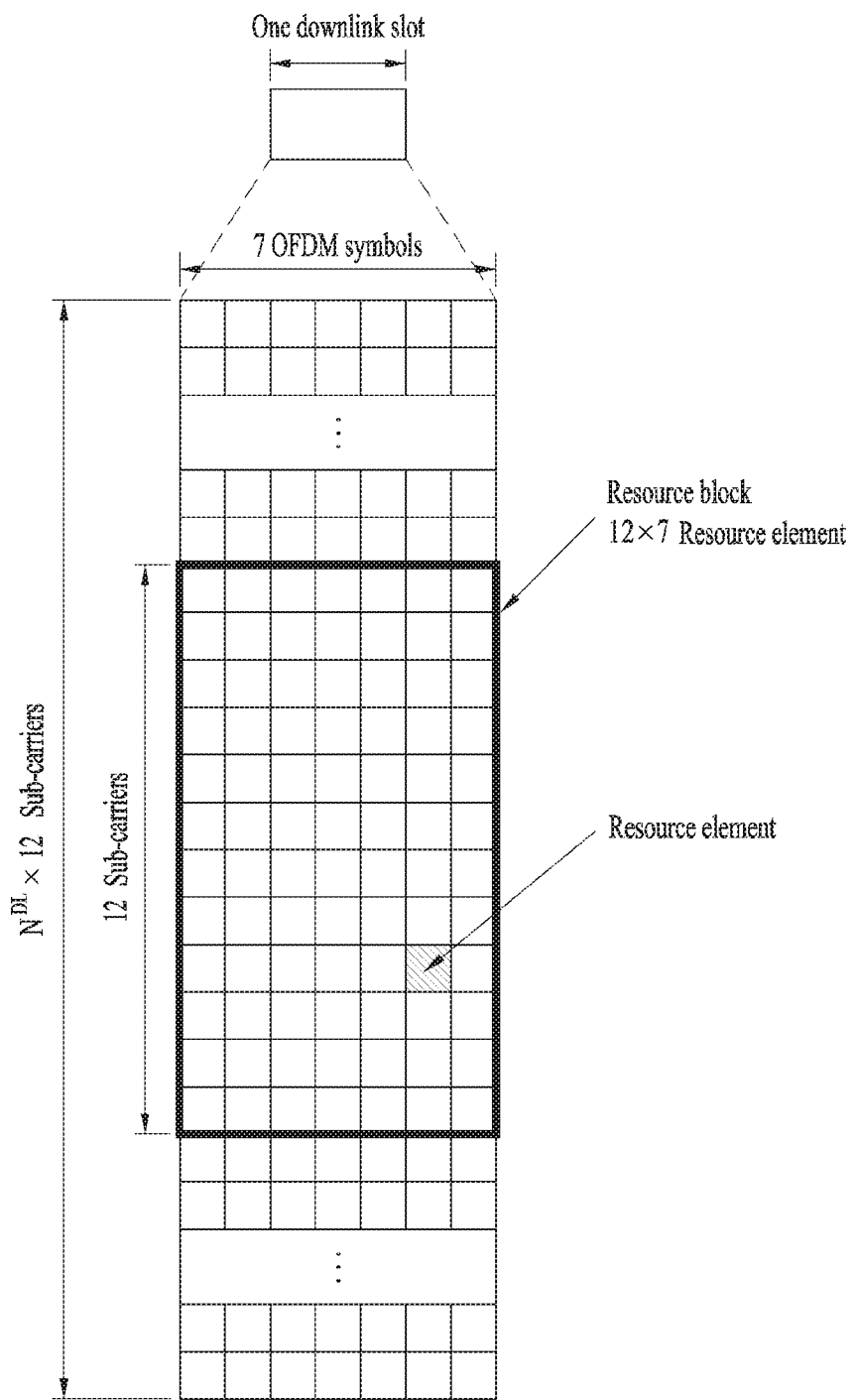
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
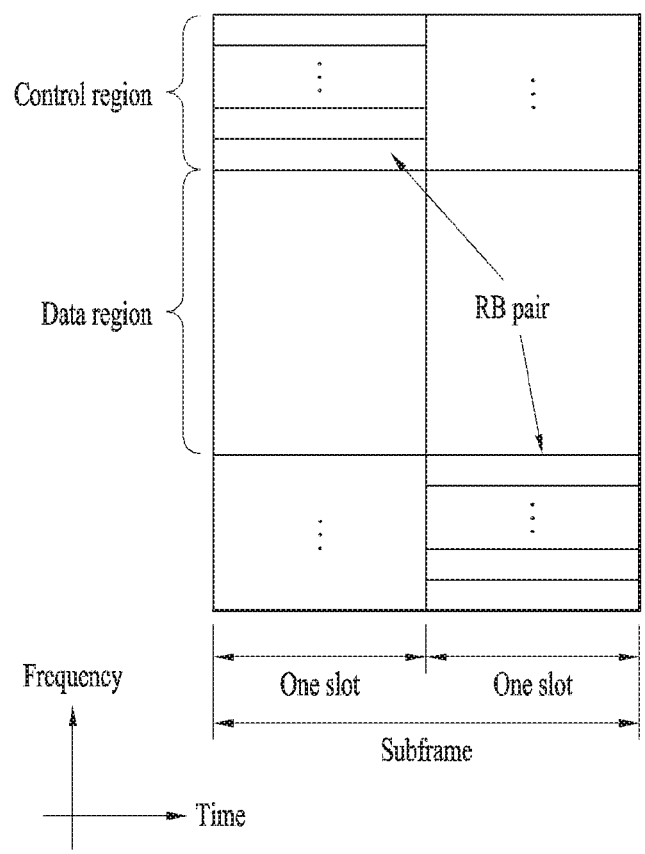
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region 2. LTE-U System 2.1 LTE-U System Configuration Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
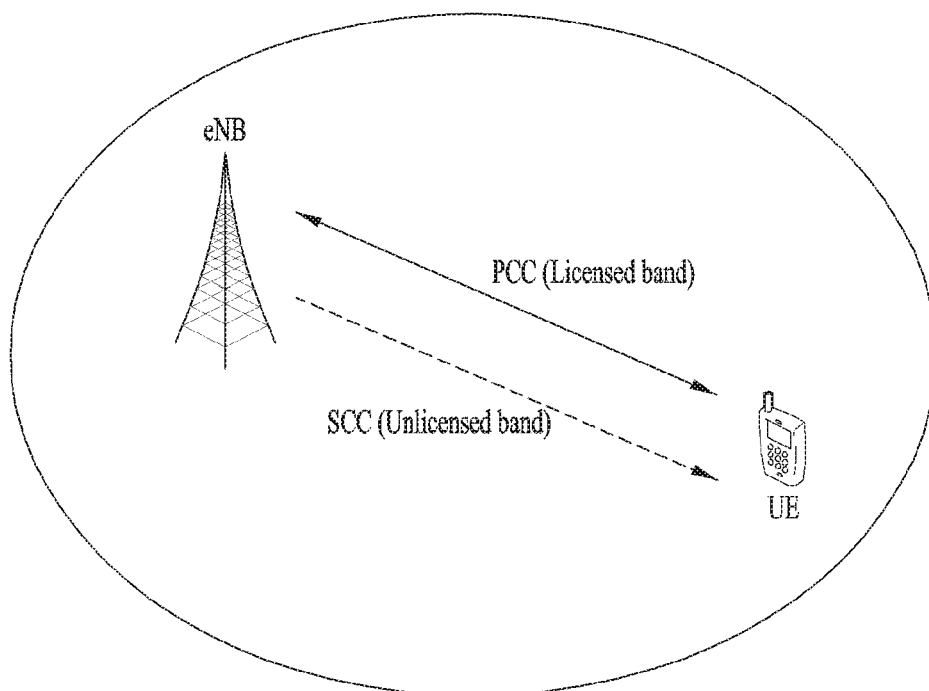
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
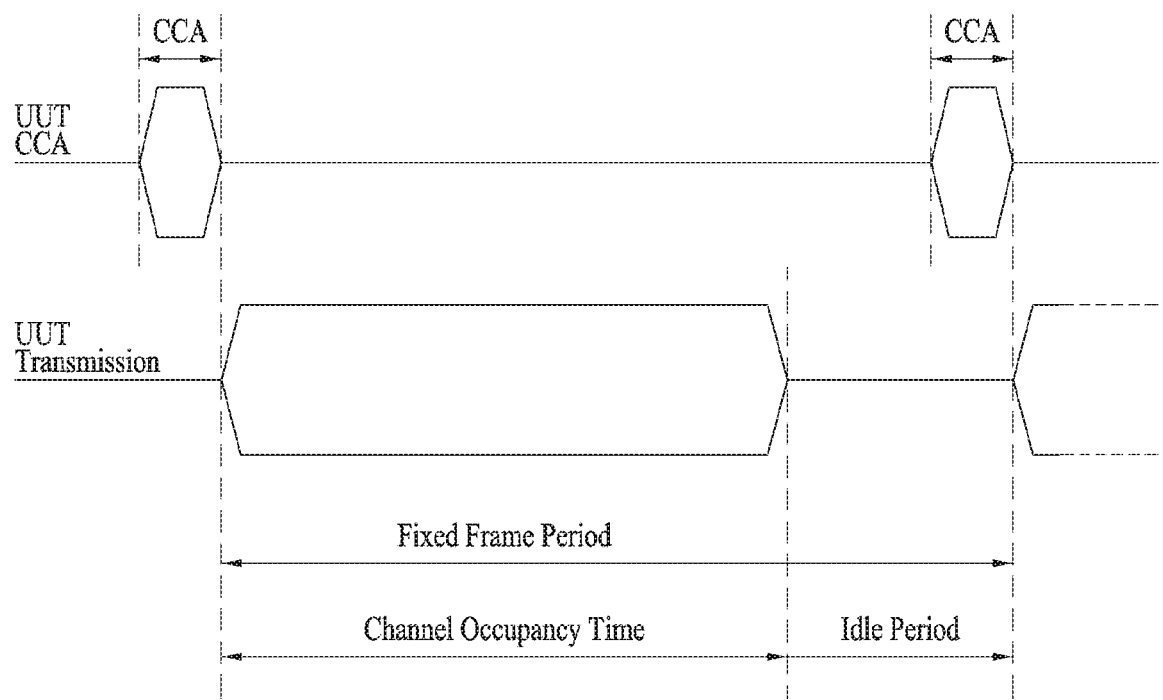
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
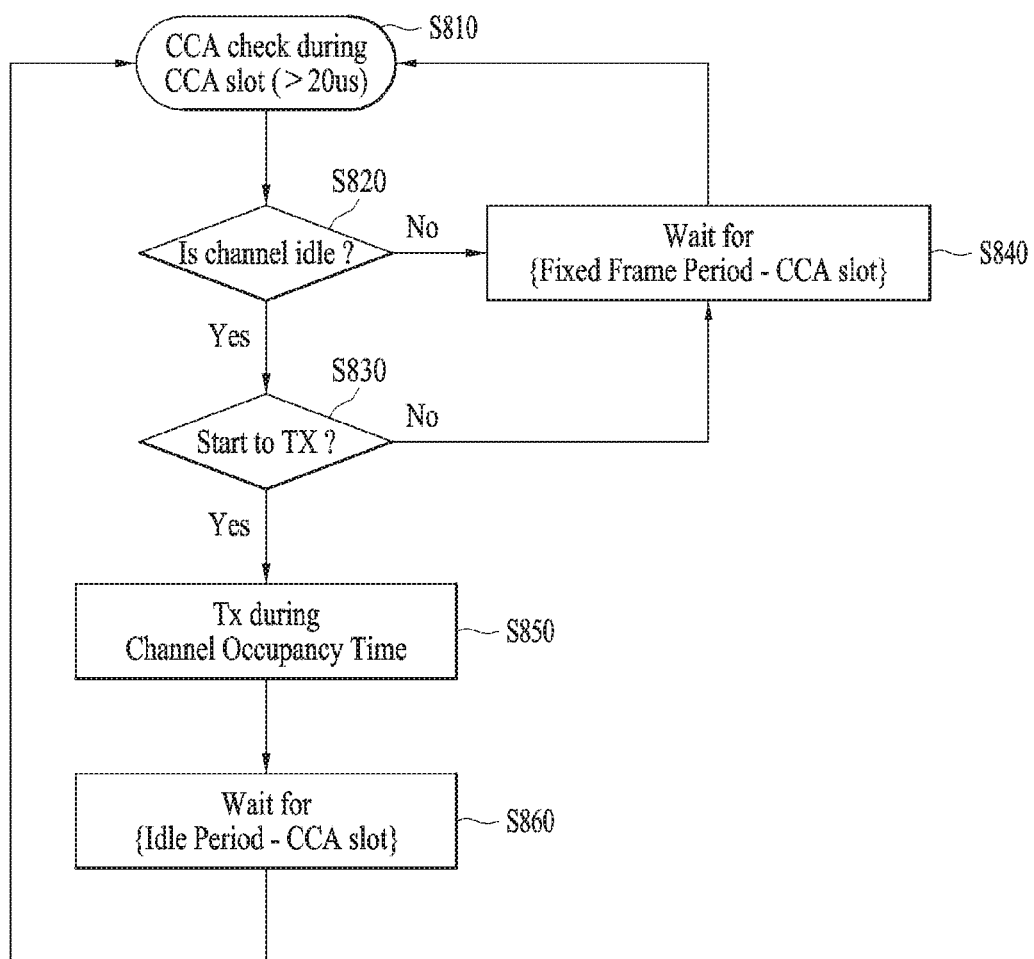
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot [S810]. If the channel is idle [S820], the communication node performs data transmission (Tx) [S830]. If the channel is busy, the communication node waits for a time period calculated by subtracting the CCA slot from a fixed frame period, and then resumes CCA [S840].

The communication node transmits data during the channel occupancy time [S850]. Upon completion of the data transmission, the communication node waits for a time period calculated by subtracting the CCA slot from the idle period [S860], and then resumes CCA [S810]. If the channel is idle but the communication node has no transmission data, the communication node waits for the time period calculated by subtracting the CCA slot from the fixed frame period [S840], and then resumes CCA [S810].

FIG. 9 is a view illustrating an exemplary LBE operation as one of the LBT operations.

Referring to FIG. 9(a), in LBE, the communication node first sets q (q∈{4, 5, . . . , 32}) and then performs CCA during one CCA slot.

FIG. 9(b) is a block diagram illustrating the LBE operation. The LBE operation will be described with reference to FIG. 9(b).

The communication node may perform CCA during a CCA slot [S910]. If the channel is unoccupied in a first CCA slot [S920], the communication node may transmit data by securing a time period of up to (13/32)q ms [S930].

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms [S940].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
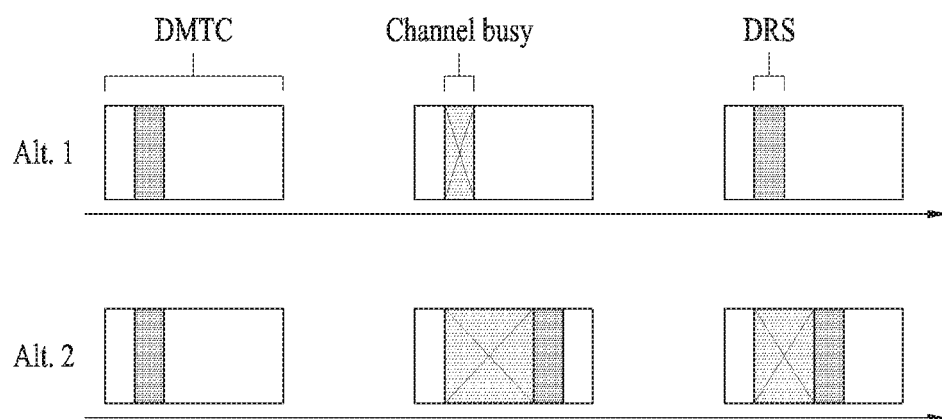
FIG. 10 is a diagram for explaining methods of transmitting a DRS supported in an LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
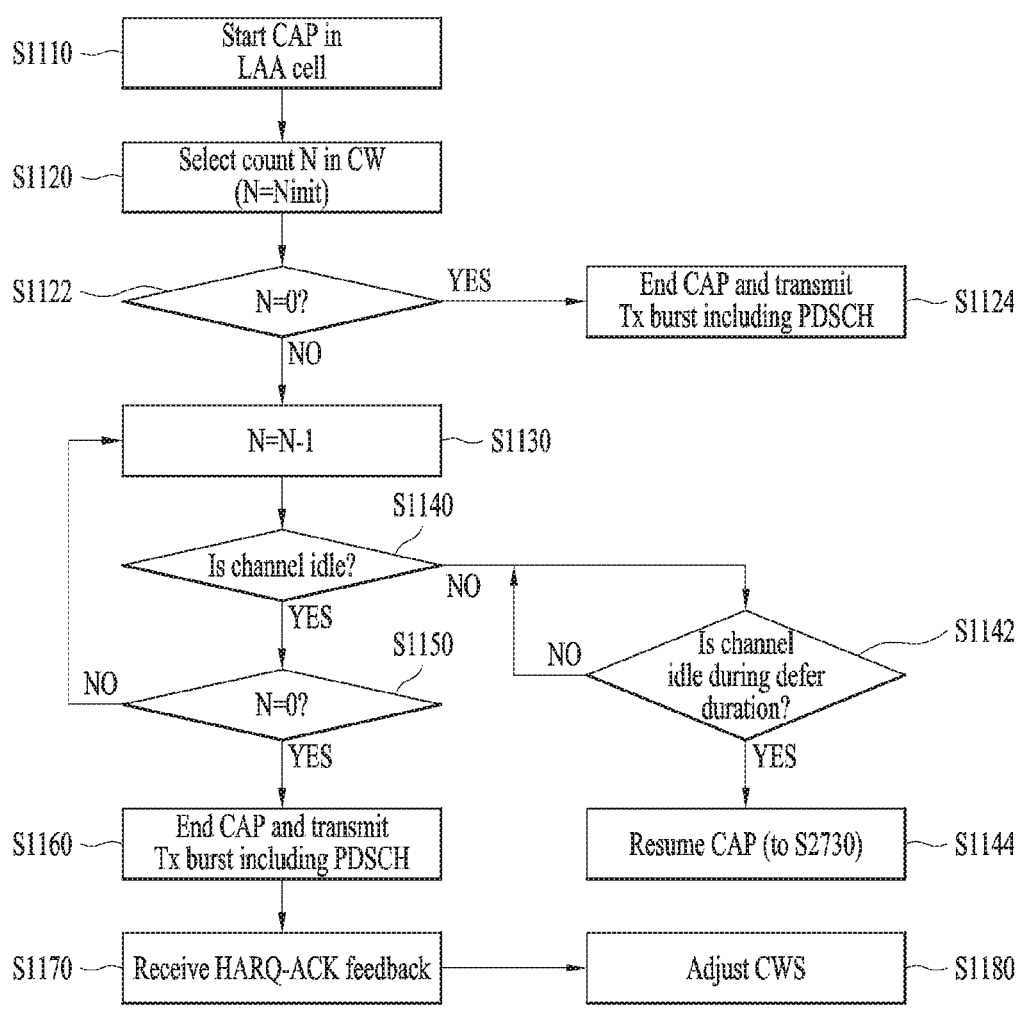
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiment

When a base station or a UE performs LBT (Listen-Before-Talk)-based signal transmission in a wireless communication system consisting of the base station and the UE, a method of transmitting and receiving a signal and a configuration therefor are explained in detail in the present invention.

According to the present invention, a base station or a UE should perform LBT to transmit a signal on an unlicensed band. When the base station or the UE transmits a signal, it is necessary to make signal interference not to be occurred with different communication nodes such as Wi-Fi, and the like. For example, according to Wi-Fi standard, a CCA threshold value is regulated by −62 dBm and −82 dBm for a non-Wi-Fi signal and a Wi-Fi signal, respectively. In particular, if an STA (station) or an AP (access point) senses a signal received with power (or energy) equal to or greater than −62 dBm rather than Wi-Fi, the STA or the AP does not perform signal transmission.

In this case, it may be difficult to always guarantee DL transmission of an eNB or UL transmission of a UE on an unlicensed. Hence, a UE operating on the unlicensed band may maintain access with a different cell operating on a licensed band to stably control mobility, RRM (radio resource management) function, and the like. In the present invention, for clarity, a cell accessed by a UE on the unlicensed band is referred to as a U-Scell (or LAA Scell) and a cell accessed by the UE on the licensed band is referred to as a Pcell. As mentioned in the foregoing description, a scheme of performing data transmission/reception on the unlicensed band using a combination with the licensed band is generally called LAA (licensed assisted access).

TABLE 2

| Channel Access Priority Class (p) | $m_p$ | $CW_{min,p}$ | $CW_{min,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

Figure 12:
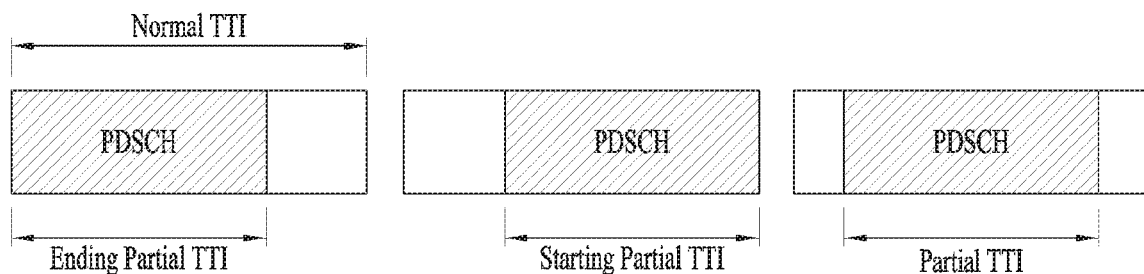
FIG. 12 is a diagram illustrating a partial TTI or a partial subframe applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

Based on the abovementioned technical contents, the present invention proposes a method of transmitting and receiving a signal (DwPTS, SRS (Sounding Reference Signal), etc.) in a situation that carriers including carriers of an unlicensed band are aggregated.

3.1. DwPTS

In an LAA Scell to which the present invention is applicable, an ending partial subframe illustrated in FIG. 12 has been introduced due to the reason described in the following.

Maximum channel occupancy time (MCOT) is defined for coexistence with other nodes on an unlicensed band. (When transmission starting time is not matched with a subframe boundary), in order to utilize the MCOT as much as possible, it is necessary for an eNB to configure the last subframe of contiguous downlink burst (hereinafter, DL burst) using a partial subframe shorter than 1 ms.

When the last subframe of the contiguous DL burst is configured by a full subframe of 1 ms, if LBT for transmitting a next contiguous DL burst is considered, at least 1 subframe is wasted without transmitting any data. On the contrary, if the last subframe of DL burst is configured by a partial subframe shorter than 1 ms and an eNB completes LBT during a timing gap between subframe boundaries, DL burst transmission is enabled from a subsequent subframe.

In this case, as illustrated in Table 3, basically, an ending partial subframe applicable to the present invention may have a structure identical to a DwPTS of a frame structure 2 (TDD).

TABLE 3

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In this case, if the number of PDCCH symbols of an ending partial subframe also follows a structure identical to DwPTS, (identical to "Subframe 1 and 6 for frame structure type 2" of Table 4) the number of PDCCH symbols of the ending partial subframe can be configured by maximum 2 symbols.

TABLE 4

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |

TABLE 4-continued

| Subframe | Number of OFDM symbols for PDCCH when $N_{RB}^{DL} > 10$ | Number of OFDM symbols for PDCCH when $N_{RB}^{DL} \leq 10$ |
|---|---|---|
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

According to a frame structure 2 of a legacy LTE system, similar to a special subframe configuration 0/5, if a DwPTS is configured by 3 symbols, PDSCH is not transmitted during the DwPTS, PDCCH/CRS (Cell-specific Reference Signal) is transmitted during maximum 2 symbols, and a PSS (Primary Synchronization Signal) is transmitted at the last $3^{rd}$ symbol.

On the contrary, in an LAA Scell to which the present invention is applicable (i.e., frame structure 3), a PSS can be transmitted at the last symbol of the first slot of an SF #0/5 (or a DRS (Discovery Reference Signal) SF). In other word, if a DwPTS having a length of 3 symbols is transmitted in the LAA Scell to which the present invention is applicable, a DL signal or a channel expected by a UE may not exist in the last $3^{rd}$ symbol. Hence, the present invention proposes a method of efficiently utilizing the remaining resource in the following.

3.1.1. First Method of Configuring DwPTS

The present invention proposes a method of allowing maximum 3 symbols of a PDCCH region to a DwPTS having a length of 3 symbols. In other word, when a DwPTS having a length of 3 symbols is transmitted in an LAA Scell to which the present invention is applicable, the number of OFDM symbols constructing a PDCCH may correspond to minimum 1 to maximum 3.

When an eNB transmits a UL grant via a partial subframe, in particular, when multi-SF scheduling for UL is introduced, a size of a corresponding scheduling grant may increase. In this case, as a PDCCH region is getting bigger, it is more profitable in the aspect of multi-SF scheduling transmission flexibility. In particular, in case of considering multi-SF UL scheduling, it may be able to allow a PDCCH region to have a symbol length as many as maximum 3 symbols not only for a DwPTS having a length of 3 symbols but also for a general DwPTS.

In this case, the number of REs available for PDSCH in a DwPTS can be decreased due to the increased number of PDCCH symbols, thereby considerably decreasing a coding rate. In order to prevent the decrease of the coding rate, it may be able to introduce a scaling factor smaller than a legacy scaling factor to a DwPTS. For example, a scaling factor value 0.6 is applied for special subframe configurations 1/2/3/4/6/7/8 and a scaling factor value 0.3 can be applied for a special subframe configuration 9. Or, it may be able to introduce a scaling factor smaller than a legacy scaling factor only when a length of PDCCH in a DwPTS corresponds to 3 symbols.

3.1.2. Second Method of Configuring DwPTS

The present invention proposes a method of correcting a length using a DwPTS of a length of 2 symbols instead of a DwPTS of a length of 3 symbols. In particular, it may be able to introduce an ending partial subframe having a length of 4400 T_s instead of a special subframe configuration 0/5.

In an LAA Scell to which the present invention is applicable, a common PDCCH has been introduced to indicate an OFDM symbol length of an ending partial subframe in a subframe immediately before the ending partial subframe and the ending partial subframe. In this case, 'Subframe configuration for LAA' field constructing the common PDCCH is shown in Table 5 in the following.

In this case, according to the present invention, a configuration corresponding to '0110' can be changed with (−,2) and a configuration corresponding to '1101' can be changed with (2,−). By doing so, it is able to minimize dummy signal transmission of an eNB.

TABLE 5

| Value of 'Subframe configuration for LAA' field in current subframe | Configuration of occupied OFDM symbols (current subframe, next subframe) |
|---|---|
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

3.2. SRS without PUSCH 3.2.1. When SRS is Transmitted without PUSCH, LBT Method of UE In a release-14 eLAA (enhanced LAA) system to which the present invention is applicable, similar to a legacy LTE system, a UE can transmit an SRS at the last symbol of a specific subframe. In this case, the specific subframe may correspond to an ending partial subframe or a normal UL subframe. In particular, the UE can transmit an SRS in the last symbol of an ending partial subframe or can transmit an SRS in the last symbol of a normal UL subframe.

In this case, when the UE transmits the SRS, it may be able to apply various LBTs to transmit the SRS. For example, it may allow the UE to transmit the SRS without LBT (LBT type 1), it may allow the UE to transmit the SRS when a channel is idle after X usec (e.g., X=25) CCA-based LBT (LBT type 2), or it may allow the UE to transmit the SRS when LBT accompanied with random backoff is completed (LBT type 3).

In this case, SRS triggering can be performed by at least one selected from the group consisting of a DL grant, a UL grant, and a common PDCCH. When a UE performs LBT to transmit an SRS, the LBT can also be indicated by a DL grant, a UL grant, a common PDCCH, and the like. In this case, when information on LBT to be performed and information on LBT to be performed by a UE is signaled by a common PDCCH, the LBT can be commonly applied not only to an SRS but also to a different UL channel (PRACH, PUSCH, PUCCH, etc.).

In the following, a method of performing LBT performed by a UE to transmit an SRS is explained in detail according to the present invention.

3.2.1.1. First LBT Method

When transmission of an SRS is triggered in the last symbol of an ending partial subframe, the present invention proposes a method of determining an LBT type according to a length of the ending partial subframe. In other word, when a length of an ending partial subframe obtained by a common PDCCH is less than Y, an LBT type performed by a UE can be configured by an LBT type A. When the length of the ending partial subframe is equal to or greater than Y, the LBT can be configured by an LBT type B. For example, in order to transmit an SRS after a DwPTS of a length of 12 symbols, the UE may attempt to perform an LBT type 1. In order to transmit an SRS after a DwPTS of a different length, the UE may attempt to perform an LBT type 2. Or, it may be able to configure the UE to perform the abovementioned LBT.

3.2.1.2. Second LBT Method

When LBT type 3 is applied as LBT for transmitting an SRS, the present invention proposes a method of applying an LBT parameter corresponding to a specific priority class among channel access priority classes set to the LBT type 3 in advance. In other word, when an LBT type performed by a UE to transmit an SRS is configured by LBT type 3 (random backoff-based LBT), the UE attempts to perform LBT to which an LBT parameter corresponding to a priority class selected from among the predetermined channel access priority classes and can perform SRS transmission based on a result of the LBT.

In this case, it is able to apply a channel access priority class for DL LBT defined in LTE release-13 or a channel access priority class separately configured for UL LBT.

In this case, the LBT type 3 can be indicated by a DL grant, a UL grant, a common PDCCH, or the like. If no LBT type is indicated by the DL grant, the UL grant, the common PDCCH, or the like, a default LBT type can be configured.

In this case, it is able to configure a specific CWS value only among CWS set values of a specific priority class as an LBT parameter for the LBT. For example, when a priority class 1 is configured by RRC signaling as an LBT parameter for the LBT, an applicable CWS set may correspond to {3,7}. In particular, 3 or 7 corresponding to one of values of the CWS set values can be applied as a CWS value applied to the LBT to transmit an SRS. As a different example, priority class 3 is configured by RRC signaling as an LBT parameter for the LBT and {15,31} among {15,31,63} can be applied only as a CWS set applied to the LBT. The CWS set can be configured by RRC signaling.

As an additional example, if multiple CWSs are configured for SRS transmission, it may be able to define a rule that a CWS is increased whenever SRS transmission fails and a CWS is reset whenever SRS transmission succeeds irrespective of whether or not a CWS is adjusted for PUSCH.

As a different additional example, it may be able to define a rule that a UE performs LBT by utilizing a CWS corresponding to a most recently used CWS to transmit PUSCH. Specifically, when a CWS value of LBT for transmitting an SRS is configured based on a priority class 2, in order to transmit an SRS, a UE can perform LBT based on a CWS identical to a priority class 2-related CWS most recently used for transmitting PUSCH. As a different example, a CWS value of LBT for transmitting an SRS can be determined in consideration of whether the CWS value applied to the LBT corresponds to a configured CWmin or an increased CWS only irrespective of a priority class of LBT most recently applied by a UE to transmit PUSCH. Specifically, when a CWS value of LBT for transmitting an SRS is configured based on a priority class 2, although a CWS of LBT most recently applied by a UE to transmit PUSCH corresponds to a CWS of a priority class 3, a CWS value of LBT for transmitting an SRS can be configured based on a minimum value or an increased CWS among configured values according to whether the CWS value corresponds to CWmin or an increased CWS. As a further different example, a UE can perform LBT by identically utilizing a CWS most recently applied to LBT for transmitting PUSCH irrespective of a priority class of LBT for transmitting an SRS.

3.2.1.3. Third LBT Method

The present invention proposes a method of not allowing a reservation signal for transmitting an SRS without PUSCH. Since SRS transmission is performed during a symbol length, transmission of a reservation signal for the SRS transmission may become overhead. Specifically, when a UE performs LBT of an LBT type 2 to transmit an SRS, the UE can perform the LBT during X usec (e.g., X=25) immediately before the $14^{th}$ symbol boundary. Or, when the UE performs LBT of an LBT type 3 to transmit an SRS, the UE can match LBT ending timing with timing immediately before the $14^{th}$ symbol boundary via self-deferral. In this case, whether or not a reservation signal for SRS transmission without PUSCH is allowed can be configured via RRC signaling.

The abovementioned first to third LBT methods can be utilized not only for SRS transmission but also for PUSCH/PUCCH/PRACH transmission after DwPTS (i.e., UpPTS position). Specifically, the PUSCH/PUCCH/PRACH can be configured by a partial subframe only shorter than 1 ms between DwPTS+GP (guard period) and a next subframe boundary.

3.2.2. Method of Transmitting SRS without PUSCH

In the present chapter, a method of configuring a gap between an SRS scheduled to be transmitted without PUSCH in the same subframe and PUSCH scheduled in a next subframe is proposed.

Figure 13:
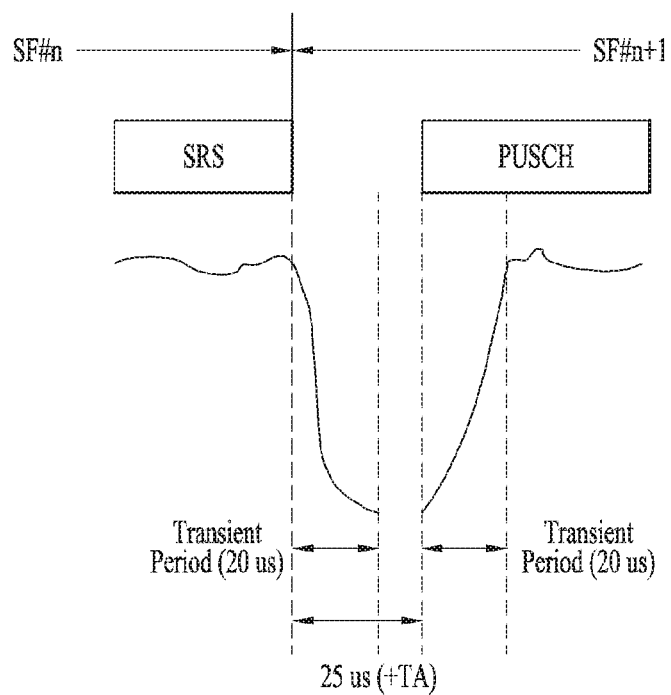
FIG. 13 is a diagram for explaining an operation of a UE when the UE is scheduled to transmit PUSCH in an SF #n+1 after the UE transmits an SRS in the last symbol of an SF #n according to one embodiment of the present invention.

FIG. 13 is a diagram for explaining an operation of a UE when the UE is scheduled to transmit PUSCH in an SF #n+1 after the UE transmits an SRS in the last symbol of an SF #n according to one embodiment of the present invention.

For example, as shown in FIG. 13, when a UE is scheduled to transmit PUSCH in SF #n+1 after an SRS is transmitted in the last symbol of SF #n, a starting position of the PUSCH can be indicated by a position appearing after 25 usec or 25 usec+TA (Timing Advance) from a boundary of the SF #n+1 in the SF #n+1. In this case, it is necessary to consider whether or not a UE is able to perform all operations including an operation of switching into a reception operation (e.g., TX→RX switching) and LBT (e.g., 25 usec LBT) (in addition, switching into a transmission operation (e.g., RX→TX switching)) during a short gap as much as 25 usec or 25 usec+TA.

In this case, the switching into the transmission operation (e.g., RX→TX switching) can be included in PUSCH transmission time in the SF #n+1. In the following, the present invention proposes a method for a UE to transmit an SRS in the SF #n and transmit PUSCH in the SF #n+1 in the abovementioned situation.

3.2.2.1. First Method of Transmitting SRS and PUSCH

When an eNB schedules a UE to transmit SF #n SRS and SF #n+1 PUSCH, the present invention proposes a method of setting a limit on a gap size between two subframes with a value of 25 usec (+TA). In this case, when the UE is scheduled to transmit the SF #n SRS and the SF #n+1 PUSCH, the UE may expect DFTS-OFDM symbol #0 or DFTS-OFDM symbol #1 only as signaling for a PUSCH starting position of the SF #n+1.

3.2.2.2 Second Method of Transmitting SRS and PUSCH

Although a PUSCH starting position is indicated by a position appearing after 25 usec or 25 usec+TA from SF #n+1 boundary, it may be difficult for a scheduled UE to perform all operations including switching to a reception operation (TX→RX switching)+25 usec LBT (+switching into a transmission operation (RX→TX switching)) during a gap between an indicated SRS and PUSCH. In this case, the present invention proposes a method for a UE to start PUSCH transmission from the timing at which a reception operation (TX→RX switching)+25 usec LBT (+switching into a transmission operation (RX→TX switching)) are completed.

If a UE completes a series of operations including switching to a reception operation (TX→RX switching)+25 usec LBT (+switching into a transmission operation (RX→TX switching)) prior to a DFTS-OFDM symbol #1 (i.e., second SC-FDM symbol), the UE can transmit an initial signal (e.g., a predetermined signal such as DM-RS/SRS, a part (extension of a CP (cyclic prefix)) of PUSCH to be transmitted in the DFTS-OFDM symbol #1 from the timing. Or, if it is difficult for a scheduled UE to perform all operations including switching to a reception operation (TX→RX switching)+25 usec LBT (+switching into a transmission operation (RX→TX switching)) during a gap between an indicated SRS and PUSCH, it is able to define a rule that the UE attempts to transmit PUSCH from the DFTS-OFDM symbol #1 boundary.

3.2.2.3. Third Method of Transmitting SRS and PUSCH

When time taken for a UE to perform all operations including switching to a reception operation (TX→RX switching)+25 usec LBT (+switching into a transmission operation (RX→TX switching)) corresponds to X (e.g., 45) us, the present invention proposes a method of indicating a PUSCH starting position by a position appearing after X us. In this case, a value of the X is configured via higher layer signaling or can be differently configured according to capability signaling reported by a UE.

Specifically, if a PUSCH starting position is indicated by a position appearing after X usec from SF #n+1 boundary, a UE can transmit PUSCH in the SF #n+1 after switching to a reception operation (TX→RX switching)+25 usec LBT (+switching into a transmission operation (RX→TX switching)) are performed. In this case, signaling indicating that the PUSCH starting position corresponds to a position appearing after the X us from a subframe boundary can be additionally introduced to signaling indicating a legacy PUSCH starting position (e.g., DFTS-OFDM symbol #0, DFTS-OFDM symbol #0+25 usec, DFTS-OFDM symbol #0+25 usec+TA, or DFTS-OFDM symbol #1). Or, when the PUSCH starting position is indicated by DFTS-OFDM symbol #0+25 usec (and/or DFTS-OFDM symbol #0+25 usec+TA), the PUSCH starting position can be configured to be interpreted as DFTS-OFDM symbol #0+X usec only when an SRS is scheduled in an SF #n and a PUSCH is scheduled in an SF #n+1.

3.2.2.4. Fourth Method of Transmitting SRS and PUSCH

The present invention proposes a method of making an on/off power transient period to be absorbed in an SRS symbol by changing a power mask of an SRS. In other word, the present invention proposes a method of including the on/off power transient period in an SRS symbol period.

In particular, among operations including switching to a reception operation (TX→RX switching)+25 usec LBT (+switching into a transmission operation (RX→TX switching)), time for switching to the transmission operation is absorbed (or included) in SF #n+1 PUSCH period and time for switching to the reception operation can be absorbed (or included) in SF #n SRS symbol period. In particular, although a PUSCH starting position is indicated by a position appearing after 25 usec or 25 usec+TA from SF #n+1 boundary, a UE according to the present invention can easily implement a corresponding operation.

3.2.2.5. Fifth Method of Transmitting SRS and PUSCH

The present invention propose a method of allowing a UE to transmit an initial signal from the last symbol boundary prior to a subframe in which a scheduled PUSCH is transmitted and a method of introducing signaling for supporting the method. In consideration of motivation of an eNB that schedules a small gap of 25 used or 25 usec+TA between an SRS and a following PUSCH, it may additionally consider a multiplexing method with a different UE transmitting a signal in an SF #n+1 (not transmitting an SRS in an SF #n). To this end, a UE 1 configured to transmit SF #n SRS+SF #n+1 is scheduled to make no gap between an SRS and a PUSCH. A UE 2 configured to transmit SF #n+1 PUSCH only can be indicated to transmit an initial signal from the last symbol of the SF #n. In this case, as the initial signal, it may apply a predetermined signal such as DM-RS/SRS or a part (extension of a CP (cyclic prefix)) of PUSCH to be transmitted in DFTS-OFDM symbol #0 of the SF #n.

3.2.2.6. Sixth Method of Transmitting SRS and PUSCH

When a short transmission-reception transition (TX-RX transition) is available (e.g., 5 us), the present invention proposes a method of including a power transient period in a small gap of 25 usec or 25 usec+TA. For example, it may be able to define that an on/off power transient period of an SRS is to be absorbed (included) in a part of a small gap of 25 usec or 25 usec+TA in SF #n and a UE performs CCA in a remaining period only.

The aforementioned first to sixth methods of transmitting an SRS and a PUSCH can be identically applied not only to a case that a UE is scheduled to transmit an SRS in SF #n and transmit PUSCH in SF #n+1 but also to a case that the UE is scheduled to transmit PUSCH in the SF #n and transmit PUSCH in the SF #n+1. In particular, when a specific UE is scheduled to transmit PUSCH in an SF #n and PUSCH in an SF #n+1 during a small gap of 25 usec or 25 usec+TA between, the UE can transmit the PUSCH in the SF #n and transmit the PUSCH in the SF #n+1 by applying a method similar to the first to sixth methods of transmitting SRS and PUSCH. For example, when the fourth method of transmitting an SRS and a PUSCH is performed, among operations including switching to a reception operation (TX→RX switching)+25 usec LBT (+switching into a transmission operation (RX→TX switching)), time for switching to the transmission operation is absorbed (or included) in SF #n+1 PUSCH duration and time for switching to the reception operation can be absorbed (or included) in SF #n PUSCH duration.

The abovementioned characteristics are more generally summarized in the following. In the aspect of the same UE, when a small gap of 25 usec or 25 usec+TA is scheduled between SRS/PUSCH/PUCCH/PRACH transmission in SF #n and PUSCH/PUCCH/PRACH transmission in SF #n+1, it may apply the aforementioned methods.

In LAA Scell to which the present invention is applicable, it is able to allow a plurality of UL subframes to be scheduled in single DCI. To this end, unlike a DCI format 0/4 scheduling a legacy UL subframe, it is able to define a new DCI format 0A/0B/4A/4B.

In this case, the DCI format 0A/0B can be used for scheduling 1 TB (transmission block) and the DCI format 4A/4B can be used for scheduling 2 TBs. And, the DCI format 0A/4A can be used for scheduling a single UL subframe and the DCI format 0B/4B can be used for scheduling maximum 4 UL subframes at a time.

In this case, the maximum number of subframes capable of being scheduled by the DCI format 0B/4B can be configured via RRC signaling and the number of subframes can be configured by a value selected from among 2 to 4. In this case, the number of subframes equal to or less than the maximum value can be actually scheduled according to DCI. The number of actually scheduled subframes can be dynamically indicated via a UL grant. And, the DCI format 0B/4B can signal a PUSCH starting position and can indicate a PUSCH starting gap not only for a first subframe but also for the remaining subframes among a plurality of UL subframes scheduled at the same time.

A position of a subframe in which an SRS is to be transmitted can be indicated by a legacy "SRS request" bit field and a subframe position to be transmitted among information corresponding to each state can be configured to be indicated via RRC signaling. In this case, among subframes scheduled via the DCI format 0B/4B, a PUSCH starting position of a subframe(s) to which a PUSCH starting gap is indicated can be configured to be determined by a different rule according to a subframe in which an SRS is transmitted.

Specifically, among subframes scheduled via the DCI format 0B/4B, if a starting gap is indicated to a subframe (e.g., SF #n+1) appearing after a subframe (e.g., SF #n) in which an SRS is transmitted, it may apply the aforementioned first to sixth methods of transmitting an SRS and PUSCH to transmit an SRS in the SF #n and transmit PUSCH in the SF #n+1.

For example, when the first method of transmitting an SRS and PUSCH is applied and a DCI format 0B/4B indicates 4 subframes including SF #1/2/3/4 to be scheduled, assume a case that a starting gap is indicated to all of the 4 subframes. If SRS transmission is indicated in the SF #2, a DFTS-OFDM symbol #0+25 usec or a DFTS-OFDM symbol #0+25 usec+TA is applied as a starting position of the SF #2/4. In this case, it may apply a DFTS-OFDM symbol #1 as a starting position of the SF #3.

As a different example, if there is a subframe in which SRS transmission is indicated (i.e., if SRS transmission is triggered) among subframes scheduled via the DCI format 0B/4B, it may apply the aforementioned first to sixth methods of transmitting an SRS and PUSCH to transmit the remaining subframe(s) except the first subframe among the scheduled subframes. For example, when the first method of transmitting an SRS and PUSCH is applied and a DCI format 0B/4B indicates 4 subframes including SF #1/2/3/4 to be scheduled, assume a case that a starting gap is indicated to all of the 4 subframes. If SRS transmission is indicated in the SF #2, it may apply a DFTS-OFDM symbol #1 as a starting position of the SF #2/3/4.

Based on the aforementioned contents, the present invention proposes a method for a UE to transmit an SRS in the following.

Due to the characteristic of an unlicensed band, a UE performs LBT to transmit an SRS. If the LBT succeeds, the UE can transmit the SRS.

In this case, if the SRS transmission does not include PUSCH transmission, it may apply random backoff-based LBT based on a predetermined channel access priority class.

In this case, the SRS transmission can be performed in the last symbol in time dimension among symbols included in a subframe.

And, when LBT is performed to transmit an SRS without PUSCH, it may apply random backoff-based LBT based on a channel access priority class having a smallest contention widow size among a plurality of channel access priority classes configured in a system. In other word, when a UE intends to perform SRS transmission only without transmitting PUSCH, the UE can perform LBT of a highest success rate among random backoff based LBTs to transmit an SRS.

For example, when LBT is performed to transmit an SRS without transmitting PUSCH, it may apply random backoff-based LBT based on a channel access priority class having a value of {3,7} as an allowed contention window size.

Moreover, a contention window size applied to the LBT for performing SRS transmission without PUSCH can be differently applied according to whether a contention window size recently applied to LBT for transmitting PUSCH corresponds to a minimum contention window size or an increased contention window size.

Specifically, if the contention window size recently applied to LBT for transmitting PUSCH corresponds to a minimum contention window size, it may apply 3 as a contention window size applied to the LBT for transmitting an SRS without PUSCH. Or, if the contention window size recently applied to LBT for transmitting PUSCH corresponds to an increased contention window size, it may apply 7 as a contention window size applied to the LBT for transmitting an SRS without PUSCH.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB informs a UE of information on whether to apply the proposed methods (or, information on rules of the proposed methods) via a predefined signal (e.g., physical layer signal or higher layer signal).

4. Device Configuration

Figure 14:
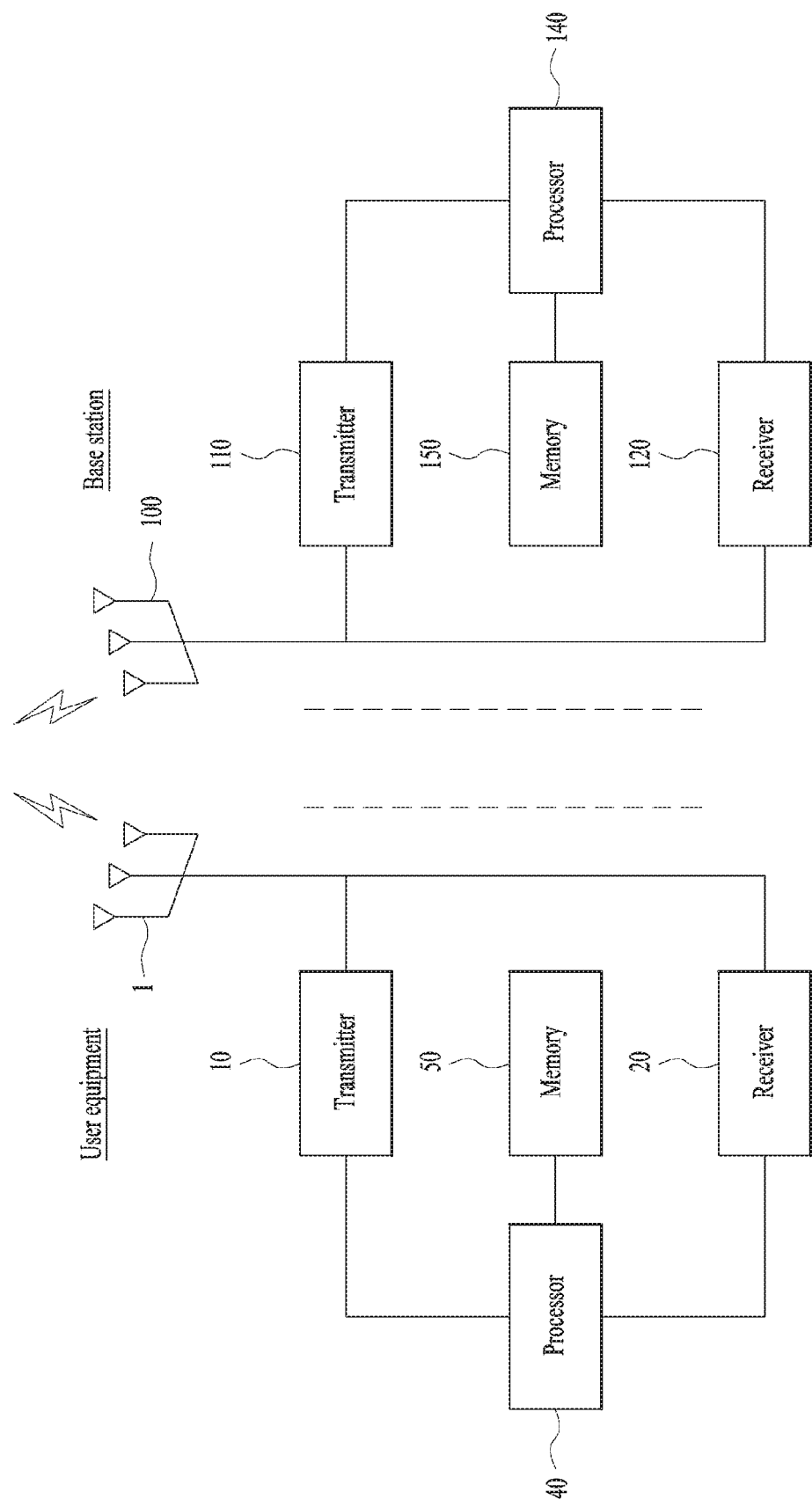
FIG. 14 is a diagram illustrating configurations of a UE and a base station in which proposed embodiments are implementable.

FIG. 14 is a diagram illustrating configurations of a UE and a base station capable of being implemented by the embodiments proposed in the present invention. A UE and a base station illustrated in FIG. 14 operate to implement embodiments for a method of transmitting and receiving a sounding reference signal without a physical uplink shared channel between the UE and the base station.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE performs LBT for transmitting an SRS via the processor 4. If the LBT succeeds, the UE can transmit the SRS. In this case, if the SRS transmission does not include PUSCH transmission, it may apply random backoff-based LBT based on a predetermined channel access priority class.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 14 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 180 or 190 and executed by the processor 120 or 130. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

What is claimed is:

1. A method of transmitting a sounding reference signal (SRS) by a user equipment (UE) to a base station in a wireless communication system supporting an unlicensed band, the method comprising:
    randomly selecting a counter N between 0 and a contention window size for a SRS transmission without a physical uplink shared channel (PUSCH); and
    wherein the counter N is decremented by 1 based on determination that the unlicensed band is sensed to be idle during a defer duration,
    based on a determination that the counter N becomes 0 by performing a channel access procedure (CAP) for the SRS transmission without the PUSCH, transmitting the SRS via the unlicensed band,
    wherein the SRS is not transmitted simultaneously with the PUSCH, and
    wherein the contention window size for the SRS transmission without the PUSCH is determined 3 or 7, based on determination that a contention window size most recently applied for transmitting the PUSCH is a minimum contention window size among allowed contention window sizes for transmitting the PUSCH or not.

2. The method of claim 1, wherein the SRS is transmitted in the last symbol among symbols included in a same subframe.

3. The method of claim 1, wherein a channel access priority class for the SRS transmission without the PUSCH is configured to a channel access priority class 1.

4. The method of claim 1, wherein the UE is capable of occupying the unlicensed band during maximum 2 ms based on the CAP for the SRS transmission without the PUSCH.

5. The method of claim 1, wherein a length of the defer duration is 25 us.

6. A user equipment (UE) for transmitting a sounding reference signal (SRS) to a base station in a wireless communication system supporting an unlicensed band, the UE comprising:
    a transmitter;
    a receiver;
    at least one processor; and at least one computer memory operably connectable to the at least one processor and storing instructions that, when executed by the at least one processor, perform operations comprising:

randomly selecting a counter N between 0 and a contention window size for a SRS transmission without a physical uplink shared channel (PUSCH), wherein the counter N is decremented by 1 based on determination that the unlicensed band is sensed to be idle during a defer duration; and based on a determination that the counter N becomes 0 by performing a channel access procedure (CAP) for the SRS transmission, wherein the SRS is not transmitted simultaneously with the PUSCH, and wherein the contention window size for the SRS transmission without the PUSCH is determined 3 or 7, based on determination that a contention window size most recently applied for transmitting the PUSCH is a minimum contention window size among allowed contention window sizes for transmitting the PUSCH or not.

7. The UE of claim 6, wherein the SRS is transmitted in the last symbol among symbols included in a same subframe.

8. The UE of claim 6, wherein a channel access priority class for the SRS transmission without the PUSCH is configured to a channel access priority class 1.

9. The UE of claim 6, wherein the UE is capable of occupying the unlicensed band during maximum 2 ms based on the CAP for the SRS transmission without the PUSCH.

10. The UE of claim 6, wherein a length of the defer duration is 25 us.

* * * * *